United States Patent [19]
Oh

[11] 4,208,106
[45] Jun. 17, 1980

[54] FLUORESCENT DISPLAYS

[75] Inventor: Chan S. Oh, Diamond Bar, Calif.

[73] Assignee: Beckman Instruments, Inc., Fullerton, Calif.

[21] Appl. No.: 928,491

[22] Filed: Jul. 27, 1978

Related U.S. Application Data

[63] Continuation-in-part of Ser. No. 727,113, Sep. 27, 1976, abandoned.

[51] Int. Cl.² ............................ G02F 1/13; C09K 3/34
[52] U.S. Cl. .................................. 350/345; 252/299; 252/408; 350/349
[58] Field of Search ................ 252/299, 408; 350/345, 350/349, 350, 346, 347

[56] References Cited

U.S. PATENT DOCUMENTS

| | | | |
|---|---|---|---|
| 3,844,637 | 10/1974 | Masi | 252/408 |
| 3,915,883 | 10/1975 | Van Meter et al. | 252/299 |
| 3,947,375 | 3/1976 | Gray et al. | 252/299 |
| 3,960,753 | 6/1976 | Larrabee | 252/299 |
| 3,975,286 | 8/1976 | Oh | 252/299 |
| 3,984,344 | 10/1976 | Cole, Jr. | 252/299 |
| 4,011,173 | 3/1977 | Steinstrasser | 252/299 |
| 4,020,002 | 4/1977 | Oh | 252/299 |
| 4,032,219 | 6/1977 | Constant et al. | 252/299 |
| 4,082,428 | 4/1978 | Hsu | 252/299 |
| 4,083,797 | 4/1978 | Oh | 252/299 |
| 4,137,192 | 1/1979 | Matsufuji | 252/299 |
| 4,143,947 | 3/1979 | Aftergut et al. | 252/299 |
| 4,145,114 | 3/1979 | Coates et al. | 252/299 |

FOREIGN PATENT DOCUMENTS

| | | | |
|---|---|---|---|
| 2538865 | 3/1976 | Fed. Rep. of Germany | 252/299 |
| 2627215 | 1/1977 | Fed. Rep. of Germany | 252/299 |
| 2837218 | 3/1979 | Fed. Rep. of Germany | 252/299 |
| 2848421 | 5/1979 | Fed. Rep. of Germany | 252/299 |
| 1459046 | 12/1976 | United Kingdom | 252/299 |
| 2003289 | 3/1979 | United Kingdom | 350/345 |
| 2003290 | 3/1979 | United Kingdom | 350/345 |

OTHER PUBLICATIONS

Baur, G. et al., J. Appl. Phys., vol. 44, No. 4, pp. 1905-1906 (Apr. 1973).
Bloom, A. et al., Mol. Cryst. Liq. Cryst., vol. 41 (Letters) pp. 1-4 (1977).
Steinstrasser, R., Angew. Chem. Internat. Edit., vol. 11, No. 7, pp. 633-634 (1972).
White, D. L. et al., J. Appl. Phys., vol. 45, No. 11, pp. 4718-4723 (1974).
Stackmann, E. et al., Chemical Physics Letters, vol. 4, No. 9, pp. 537-540 (1970).
Baur, G. et al., Mol. Cryst. Liq. Cryst., vol. 22, pp. 261-269 (1973).
Larrabee, R. D., RCA Rev., vol. 34, pp. 329-335 (1973).
Constant, J. et al., "Pleochroic Dyes with High Order Parameters", presented at 6th Int. Liq. Cryst. Conf., Kent, Ohio (Aug. 1976).

*Primary Examiner*—Teddy S. Gron
*Attorney, Agent, or Firm*—Robert J. Steinmeyer; Robert S. Frieman

[57] ABSTRACT

Fluorescent displays are comprised of a means for cooperatively aligning a liquid crystal material and a fluorescent medium disposed therein. The fluorescent medium is comprised of a nematic liquid crystal host which is effectively transparent to radiation of both near ultraviolet and visible wavelengths and a fluorescent guest whose visible fluorescent intensity varies with the phase or orientation of the liquid crystal host.

18 Claims, 2 Drawing Figures

FLUORESCENT DISPLAYS

CROSS REFERENCES TO RELATED APPLICATION

This application is a continuation-in-part of application Ser. No. 727,113, filed Sept. 27, 1976, now abandoned.

BACKGROUND OF THE INVENTION

1. Field of the Invention

The present invention relates to a fluorescent medium comprising a liquid crystal host containing a dissolved fluorescent guest whose visible fluorescent intensity is dependent upon the phase or orientation of the liquid crystal host. Also, the present invention relates to fluorescent displays comprising a means for cooperatively aligning a liquid crystal material and the above fluorescent medium disposed therein.

2. Description of the Prior Art

Nematic liquid crystal materials are finding wide use in display devices such as watch faces. One difficulty with conventional nematic liquid crystal devices is that they depend on the ambient light for illumination. It would be desirable to be able to employ nematic liquid crystal materials in display devices capable of use in dark environments.

It is known that liquid crystals can be used as a matrix to orient pleochroic and fluorescent guest molecules. See G. Baur, A. Stieb, and G. Meier, Polarized Fluorescence of Dyes Oriented in Room Temperature Nematic Liquid Crystals, *Molecular Crystals and Liquid Crystals*, 22:261 to 269 (1973); R. D. Larrabee, Fluorescence Switching by Means of Liquid Crystals, *RCA Review*, 34:329 to 336 (2973); G. Baur, A. Stieb and G. Meier, Quenching of Fluorescence at the Nematic-Istropic Phase Transition, *J. Appl. Phys.*, 44(4):1905 to 1906 (1973); and U.S. Pat. No. 3,960,753. However, the interaction between liquid crystal hosts and dissolved fluorescent dyes currently is not susceptible to extrapolation and therefore operable liquid crystal/fluorescent material compositions cannot be predicted. See U.S. Pat. No. 3,960,753.

SUMMARY OF THE INVENTION

The present invention encompasses a fluorescent medium comprising from about 0.01 to about 10 weight percent of a rigid, lath shaped, fluorescent dye guest having a uniform major polarization axis and from about 90 to about 99.99 weight percent of a nematic liquid crystal host material which is substantially transparent to near ultraviolet and visible radiation. The nematic liquid crystal material is selected from a group consisting of 4-cyano-4'-biphenyl, wherein R is selected from a group consisting of alkyl and alkoxy groups containing from about 3 to about 10 carbon atoms per group; mixtures thereof; and a nematic solution comprising a positive dielectric anisotropy moiety and another dielectric anisotropy moiety, said positive dielectric anisotropy moiety comprised of from about 0 to about 100 mole percent of said 4-cyano-4'-R-biphenyl and from about 0 to about 100 mole percent of 4'-cyanophenyl-4-Ybenzoate, wherein Y is selected from a group consisting of alkyl and alkoxy groups containing from about 1 to about 9 carbon atoms per group, and said other dielectric anisotropy moiety comprised of from about 0 to about 50 mole percent of a compound having a formula I

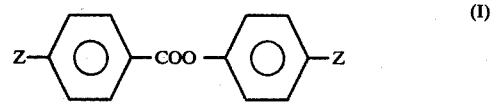

and from about 50 to about 100 mole percent of a compound having a formula II

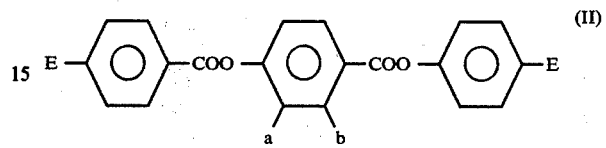

wherein each Z is independently selected from a group consisting of alkyl and alkoxy groups containing from about 1 to about 9 carbon atoms per group, wherein each E is independently selected from a group consisting of alkyl and alkoxy groups containing from about 1 to about 7 carbon atoms per group, and wherein a and b are independently selected from a group consisting of hydrogen and chlorine, provided that if a is chlorine, b must be hydrogen, and if b is chlorine, a must be hydrogen.

The host can optionally comprise from about 0.2 to about 40 weight percent of a chiral material and from about 60 to about 99.99 weight percent of said liquid crystal material.

Also encompassed within the scope of this invention is a fluorescent display which comprises a means for cooperatively aligning a liquid crystal material and the above described fluorescent medium disposed therein.

DESCRIPTION OF THE PREFERRED EMBODIMENTS

Figure 1:
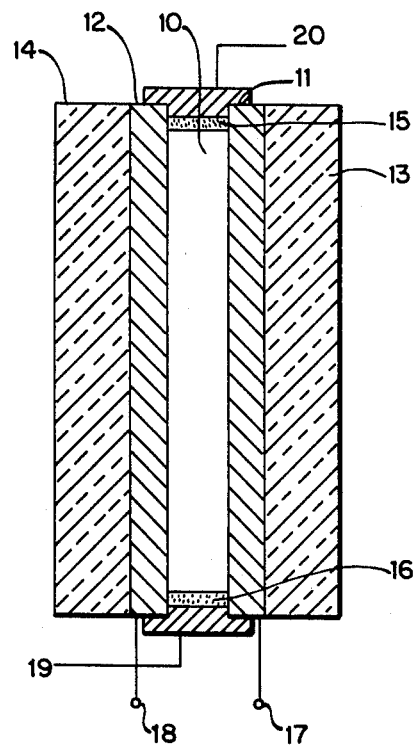
FIG. 1 is a cross-sectional view of a parallel plate liquid crystal display.

The present invention encompasses a fluorescent display comprising a means for cooperatively aligning a liquid crystal material and a fluorescent medium disposed therein. The means for cooperatively aligning a liquid crystal material can be any such means well known to those skilled in the art. These liquid crystal displays generally comprise a means for defining a compartment for receiving said liquid crystal material, at least one pair of electrodes located within said compartment, and means for providing an electric field across said electrodes for cooperatively aligning said liquid crystal material. These means for cooperatively aligning a liquid crystal material are generally divided into two basic liquid crystal display categories. One type of display is called a parallel plate liquid crystal display and the other type of display is referred to as an interdigitated liquid crystal display. The parallel plate liquid crystal display is schematically represented in FIG. 1, wherein a nematic liquid crystal solvent 10, containing a fluorescent guest, is disposed between one or more thin transparent electrodes 11 and 12 disposed on one or more clear plates 13 and 14, e.g., glass plates. The surfaces of the clear plates 13 and 14 upon which the electrodes 11 and 12 are disposed are parallel to and oppposite to each other and separated by spacers 15 and 16. The spacing between the electrodes 11 and 12 may vary from about 5 to 50 microns with nominal values being in the 10 to 20 micron range. The electrodes 11 and 12 are connected to leads 17 and 18 which in turn are connected to a voltage source (not shown). The liquid crystal cell is sealed with hermetic, water-tight seal 19 and 20. When a voltage is applied across the electrodes 11 and 12 the fluorescence of the fluorescent guest changes.

Figure 2:
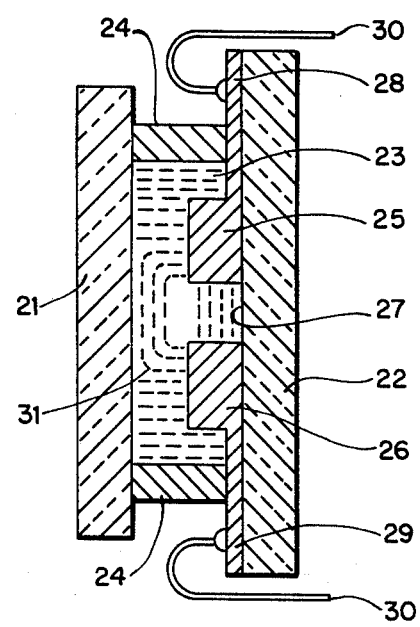
FIG. 2 is a cross-sectional view of an interdigitated liquid crystal display.

FIG. 2 is a schematic representation of the interdigitated liquid crystal display, wherein a pair of oppositely disposed flat substrates 21 and 22 sandwich a film 23 of fluorescent medium therebetween. The substrates 21 and 22 are maintained in spaced-apart and sealed together relation by means of a shim 24. Two electrodes 25 and 26 are disposed on side by side relation on the inner surface of the substrate 22. The electrodes 25 and 26 comprise thin films of a transparent electrically conductive material. Also, two conductors 28 and 29, also of a transparent conductive material are disposed on the surface 27 and extend from each of the electrodes 25 and 26, respectively, to exposed peripheral surfaces of the substrate 22, where terminals 30 are soldered to the connectors. When a voltage is applied between the two electrodes 25 and 26 via the two terminals 30, an electric field, as indicated by the use of dash lines 31, representative of some of the electric field lines, is provided through the film 23 between the electrodes 25 and 26. As shown, the electric field lines 31 fringe outward and away from the two electrodes 25 and 26 and, depending upon the dimensions of the device, the fluorescent medium used, and the voltage applied, a portion of the film 23 adjacent to and between the two electrodes 25 and 26 is switched to its alternate state. Owing to the different optical characteristics of this "switched" portion of the film, in comparison with the unaltered optical characteristics of the unswitched adjacent portions of the film 23, the two portions are optically distinguishable from each other. By suitable shaping of the two electrodes 25 and 26, an image can be displayed.

The fluorescent medium disposed within said means for cooperatively aligning a liquid crystal material comprises from about 0.01 to about 10, preferably from about 0.05 to about 5, and more preferably from about 0.1 to about 0.5 weight percent of a rigid, lath shaped, fluorescent dye guest having a uniform major polarization axis and from about 90 to about 99.99, preferably from about 95 to about 99.95, and more preferably from about 99.5 to about 99.9 weight percent of a host liquid crystal material. The liquid crystal material is selected from a group consisting of 4-cyano-4'-R-biphenyl, wherein R is selected from a group consisting of alkyl and alkoxy groups containing from about 3 to about 10 carbon atoms per group; mixtures thereof; and a nematic solution comprising a positive dielectric anisotropy moiety and another dielectric anisotropy moiety, said positive dielectric anisotropy moiety comprised of from about 0 to about 100, preferably from about 40 to about 100, mole percent of said 4-cyano-4'-R-biphenyl and from about 0 to about 100, preferably from about 0 to about 60, mole percent of 4'-cyanophenyl-4-Y-benzoate, wherein Y is selected from a group consisting of alkyl and alkoxy groups containing from about 1 to about 9 carbon atoms per group, and said other dielectric anisotropy moiety comprised of from about 0 to about 50 mole percent of a compound having a formula I

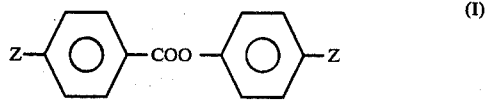

and from about 50 to about 100 mole percent of a compound having a formula II

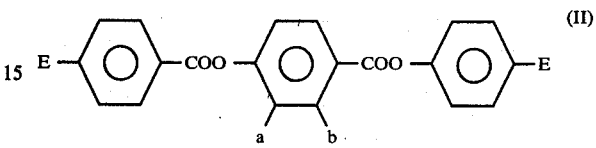

wherein each Z is independently selected from a group consisting of alkyl and alkoxy groups containing from about 1 to about 9 carbon atoms per group, wherein each E is independently selected from a group consisting of alkyl and alkoxy groups containing from about 1 to about 7 carbon atoms per group, and wherein a and b are independently selected from a group consisting of hydrogen and chlorine, provided that if a is chlorine, b must be hydrogen and if b is chlorine, a must be hydrogen.

R is preferably selected from a group consisting of alkyl and alkoxy groups containing from about 5 to about 8 carbon atoms per group. R is also preferably a straight chain alkyl or alkoxy group. The preferred 4-cyano-4'-R-biphenyl is selected from a group consisting of 4-cyano-4'-n-heptylbiphenyl, 4-cyano-4'n-pentylbiphenyl, and mixtures thereof.

The nematic solution preferably comprises from about 40 to about 80 mole percent of said positive dielectric anistropy moiety and from about 20 to about 60 mole percent of said other dielectric anisotropy moiety. also, preferably, the positive dielectric anisotropy moiety of the nematic solution is comprised of from about 65 to about 95 mole percent of 4-cyano-4'-R-biphenyl and from about 5 to about 35 mole percent of 4'-cyanophenyl-4-Y-benozoate.

Y is preferably a straight chain alkyl or alkoxy group. Also, Y preferably is selected from the group consisting of alkyl and alkoxy groups containing from about 4 to about 7 carbon atoms per group. The preferred 4'-cyanophenyl-4-Y-benzoate is 4'-cyanophenyl-4-n-heptylbenzoate.

It is also preferred that each Z be independently selected from the group consisting of alkyl and alkoxy groups containing from about 3 to about 6 carbon atoms per group. In addition, each Z is preferably a straight chain alkyl or alkoxy group.

Each E is preferably independently selected from the group consisting of alkyl and alkoxy containing from about 3 to about 5 carbon atoms per group. Also, each E is preferably a straight chain alkyl or alkoxy group.

The host liquid crystal material can optionally comprise from about 0.1 to about 40 weight percent, preferably from about 1 to about 30 weight percent, and more preferably from about 5 to about 20 weight percent, of a chiral material and from about 60 to about 99.9 weight percent, preferably from about 70 to about 99 weight percent, and more preferably from about 80 to about 95 weight percent, of said liquid crystal material.

The fluorescent dye capable of being used in the fluorescent medium of the present invention can be any rigid, lath shaped fluorescent dye possessing a uniform major polarization axis well known to those skilled in the art. Exemplary fluorescent dyes include 4-N,N-dimethylamino-4'-nitrostilbene, tetracene, 7-diethyl-4-methyl coumarin, 2,2'-(vinylenedi-p-phenylene)bisbenoxazole, 2,2'-(vinylenedi-p-phenylene)hydroxyterephthalate, pyrene, anthracene, diphenyl-hexatriene, and those fluorescent dyes enumerated in U.S. Pat. No. 3,960,753, said patent being incorporated herein in toto by reference. Preferred fluorescent dyes which can be used in the present invention include 4-N,N-dimethylamino-4'-nitrostilbene, tetracene, 7-diethyl-4-methyl coumarin, 2,2'-(vinylenedi-p-phenylene)bisbenoxazole, and 2,2-(vinylenedi-p-phenylene)hydroxyterephthalate.

Any chiral material well known to those skilled in the art can be used in the fluorescent displays of the present invention where noted above. The preferred chiral material is selected from a group consisting of cholesterol nonanoate and compounds having a formula

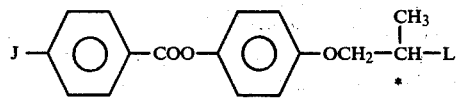

wherein J is an alkyl group containing from about 1 to about 7, preferably from about 4 to about 6, carbon atoms and L is an alkyl group containing from about 2 to about 9, preferably about 2 to about 4, carbon atoms and wherein the asterisk represents an asymmetrically substituted carbon atom.

The following examples are provided for the purpose of further illustration only and are not intended to be limitations on the disclosed invention.

EXAMPLE 1

Into an experimental negative dielectric anistropic nematic solvent mixture (99.1 weight percent) of substituted phenyl benzoates, E. Merck's Nematic Phase 9 brand liquid crystal materials, 4-N,N-dimethylamino-4'-nitrostilbene (0.1 weight percent) was added and heated to dissolve. Upon cooling to room temperature, a light orange-yellow nematic phase was obtained. This mixture was introduced into a parallel plate electrooptic cell. The electrooptic cell had a seven segment numeric pattern conductive plane and a front plane which was entirely conductive. These conductive transparent coatings consisted of a tin doped indium oxide. The glass employed in the electrooptic cell was regular float glass. The pattern and front planes were spaced apart by the use of a 12 micron Mylar brand strip. The initial homeotropic alignment of the liquid crystal was achieved by a conventional method. See F. J. Kahn, *Appl. Phys. Lett.*, 22(8):386 (1973), said publication being incorporated herein in toto by reference. The electrooptic cell containing said mixture was placed on a dark background and illuminated by an ultraviolet light source (350 to 430 nm). One of the seven segments of the pattern plane and back plane was connected to an electric source (30 V peak to peak (p-p), 5 KHz). The activated segment emitted a glowing orange color to the bare eye. The fluorescent intensity did not change when either the viewing angle or the illumination angle was varied.

EXAMPLE 2

Using the same fluorescent medium filled electrooptic cell of Example I, the frequency of the electric source was switched to 50 Hz. This switch in frequency of the electric source caused the mixture to undergo a change from the dielectric regime to the dynamic scattering mode. Under ambient light, the energized segment appeared light scattering. Under ultraviolet illumination, the segment emitted a glowing orange fluorescence.

Example II depicts a fluorescent display embodiment within the scope of this invention wherein the fluorescent displays can be used in conjunction with either ambient or ultraviolet light.

EXAMPLE 3

A positive dielectric anistropic ester nematic mixture was prepared by mixing equal weight parts of 4'-cyanophenyl-4-n-propylbenzoate and 4'-cyanophenyl-4-n-heptylbenozate. To 99.5 weight percent of the above mixture, 0.5 weight percent of 4-N,N-dimethylamino-4'-nitrostilbene was dissolved by heating and stirring. Upon cooling to room temperature, a light orange-yellow nematic phase was obtained. Similarly, a positive dielectric anistropic biphenyl nematic mixture (99.5 weight percent) comprising equal weight parts of 4-cyano-4'-n-heptylbiphenyl and 4-cyano-4'-pentylbiphenyl, was mixed with 0.5 weight percent 4-N,N-dimethylamino-4'-nitrostilbene. The resultant room temperature nematic phase possessed a bright orange-yellow color.

The under surfaces of the pattern and back planes of electrooptic cells structurally identical to the electrooptic cell described in Example I were rubbed with lens paper in order to induce the initial homogeneous alignment. Each of the above two positive dielectric anisotropic nematic mixtures was introduced into a separate cell. Upon illumination with ultraviolet light, the entire surface of both cells emitted a glowing orange fluorescence. Electric fields within the range of about 4 to 6 V p-p and 60 Hz to 6 KHz were applied both cells. Each activated segment appeared almost dark to the naked eye while each inactivated area emitted an orange fluorescence. In the case of both cells, the intensity of the orange fluorescence did not vary with either the viewing angle of the illumination angle.

EXAMPLES 4-23

Each dye (10 mg) of Table I was dissolved in one gram of liquid crystalline mixture of Table II and left to cool to room temperature. The fluorescent dye saturated liquid crystal was introduced into a liquid crystal cell (1"×2", spacing 6~10 micron), of which inner surfaces have opposing transparent electrodes (indium oxide) and on top of these electrodes, a surface alignment film was deposited in such a manner that the nematic molecules assumed "hemogenous" alignment. Thus, the long axis of the nematic molecules, and hence, the long axis of the fluorescent dye molecule laid unidirectionally parallel to the substrate surface.

The liquid crystal cells were examined under ultraviolet light and the fluorescent colors observed are set forth in Table III. An electric field was imposed between the opposing (6 volt) electrodes, and the observed fluorescence of the activated areas was recorded.

TABLE I

RIGID, LATH SHAPED, FLUORESCENT DYES

| Dye No. | Name |
|---|---|
| 1 | 4,4'-Bis(2-benzoxazolyl)stilbene |
| 2 | 2-(4-Biphenylyl)-6-phenylbenzoxazole |
| 3 | 2-(4-Biphenylyl)-5-(p-tert.-butylphenyl)-1,3,4-oxadiazole |
| 4 | 2,2'-p-phenylenebis-(4-methyl-5 phenyloxazole) |
| 5 | 2,5-Bis(5'-tert.-butyl-2-benzoxazolyl)-thiophene |
| 6 | Pentacene |
| 7 | Quarterphenyl |
| 8 | 1,4-Diphenyl-1,3-butadiene |
| 9 | 1,6-Diphenylhexatriene |
| 10 | 1,8-Diphenyl-1,3,5,7-octatriene |

TABLE II

LIQUID CRYSTAL MIXTURES

| | Weight |
|---|---|
| A. ESTER MIXTURES | |
| 4'-n-Butylphenyl-4-n-hexloxybenzoate | 27.62 |
| 4'-n-Methoxyphenyl-4-n-heptylbenzoate | 27.62 |
| 4'-n-Pentylphenyl-3-chloro-4-(4'-n-pentylbenzoylaxy)benzoate | 13.82 |
| 4'-n-Cyanophenyl-4-n-heptylbenzoate | 3.32 |
| B. ESTER-BIPHENYL MIXTURE | |
| 4'-n-hexyloxyphenyl-4-n-butylbenzoate | 8.64 |
| 4'Cyanophenyl-4-n-heptylbenzoate | 9.53 |
| 4-Cyano-4'-n-heptylbiphenyl | 39.30 |
| 4-Cyano-4'-n-heptylbiphenyl | 25.17 |
| 4'-n-Pentylphenyl-3-chloro-4-(4'-n-pentylbenzoyloxy)benzoate | 15.67 |
| 4'-(S-2-Methylbutoxy)phenyl-4-n-hexylbenzoate | 1.70 |

TABLE III

COMPARATIVE FLUORESCENT LCD

| Example | Fluorescent Dye | Nematic Mixture | Fluorescent Color Field OFF | Field ON |
|---|---|---|---|---|
| 4 | 1 | A | Violet | Dark |
| 5 | 1 | B | Violet | Dark |
| 6 | 2 | A | Violet | Dark |
| 7 | 2 | B | Violet | Dark |
| 8 | 3 | A | Violet | Dark |
| 9 | 3 | B | Violet | Dark |
| 10 | 4 | A | Blue | Dark |
| 11 | 4 | B | Blue | Dark |
| 12 | 5 | A | Blue | Dark |
| 13 | 5 | B | Blue | Dark |
| 14 | 6 | A | Violet | Dark |
| 15 | 6 | B | Green | Dark |
| 16 | 7 | A | Violet | Dark |
| 17 | 7 | B | Violet | Dark |
| 18 | 8 | A | Blue-Violet | Dark |
| 19 | 8 | B | Blue-Violet | Dark |
| 20 | 9 | A | Blue | Dark |
| 21 | 9 | B | Blue | Dark |
| 22 | 10 | A | Green | Dark |
| 23 | 10 | B | Green | Dark |

Examples 4-23 clearly show that numerous rigid, lath shaped, fluorescent dye guests are effective in the host materials employed in the instant invention.

Based on this disclosure, many other modifications and ramifications will naturally suggest themselves to those skilled in the art. These are intended to be comprehended as within the scope of this invention.

The embodiments of the invention in which an exclusive property or privilege is claimed are defined as follows:

1. A fluorescent medium comprising:

(a) from about 0.01 to about 10 weight percent of a rigid, lath shaped, fluorescent dye guest having a uniform major polarization axis and (b) from about 90 to 99.99 weight percent of a host comprising a liquid crystal material selected from a group consisting of:

(i) 4-cyano-4'-R-biphenyl, wherein R is selected from a group consisting of alkyl and alkoxy groups containing from about 3 to about 10 carbon atoms per group;

(ii) mixtures thereof; and (iii) a nematic solution comprising a positive dielectric anisotropy moiety and another dielectric anisotropy moiety, said positive dielectric anisotropy moiety comprised of from about 0 to about 100 mole percent of said 4-cyano-4'-R-biphenyl and from about 0 to about 100 mole percent of 4'-cyanophenyl-4-Y-benzoate, wherein Y is selected from a group consisting of alkyl and alkoxy groups containing from about 1 to about 9 carbon atoms per group, provided that if said positive dielectric anisotropy moiety is comprised of 0 mole percent 4-cyano-4'-R-biphenyl, said positive dielectric anisotropy moiety must be comprised of greater than 0 mole percent 4'-cyanophenyl-4-Y-benzoate and if said positive dielectric anisotropy moiety is comprised of 0 mole percent 4'-cyanophenyl-4-Y-benzoate, said positive dielectric anisotropy moiety must be comprised of greater than 0 mole percent 4-cyano-4'-R-biphenyl; and said other dielectric anisotropy moiety comprised of from about 0 to about 50 mole percent of a compound having a formula I

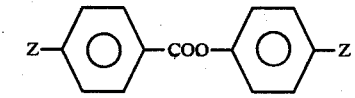

and from about 50 to about 100 mole percent of a compound having formula II

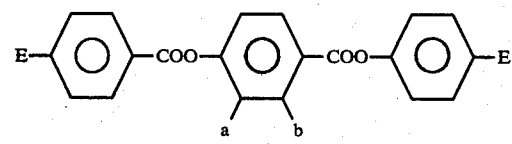

wherein each Z is independently selected from a group consisting of alkyl and alkoxy groups containing from about 1 to about 9 carbon atoms per group, wherein each E is independently selected from a group consisting of alkyl and alkoxy groups containing from about 1 to about 7 carbon atoms per group, and wherein a and b are independently selected from a group consisting of hydrogen and chlorine, provided that if a is chlorine, b must be hydrogen and if b is chlorine, a must be hydrogen.

2. The fluorescent medium of claim 1 wherein said host comprises from about 0.1 to about 40 weight percent of a chiral material and from about 60 to about 99.9 weight percent of said liquid crystal material, wherein said liquid crystal material is selected from a group consisting of said nematic solution (iii) and 4-cyano-4'-R-biphenyl compounds (i).

3. The fluorescent medium of claim 1 comprising:
(a) from about 0.05 to about 5 weight percent of said fluorescent dye and
(b) from about 95 to about 99.95 weight percent of said host material wherein each R is independently selected from the group consisting of straight chain alkyl and alkoxy groups containing from about 5 to about 8 carbon atoms per group; and wherein said nematic solution (iii) comprises from about 40 to about 80 mole percent of said positive dielectric anisotropy moiety and from about 20 to about 60 mole percent of said other dielectric anisotropy moiety; wherein said positive dielectric anisotropy moiety is comprised of from about 65 to about 95 mole percent of 4-cyano-4'-n-R-biphenyl and from about 5 to about 35 mole percent of 4'-cyanophenyl-4-n-Y-benzoate; wherein each Z is independently selected from the group consisting of straight chain alkyl and alkoxy groups containing from about 3 to about 6 carbon atoms per group; wherein each E is independently selected from the group consisting of straight chain alkyl and alkoxy groups containing from about 3 to about 5 carbon atoms per group.

4. The fluorescent medium of claim 3 wherein said host comprises from about 1 to about 30 weight percent of a chiral material and from about 70 to about 99 weight percent of said liquid crystal material, wherein said liquid crystal material is selected from a group consisting of said nematic solution (iii) and 4-cyano-4'-n-R-biphenyl compound (i).

5. The fluorescent medium of claim 3 wherein said liquid crystal material is selected from the group consisting of 4-cyano-4'-n-R-biphenyl (i); mixtures thereof (ii); and said nematic solution (iii) wherein said positive dielectric anisotropy moiety is comprised of from about 65 to about 95 mole percent of 4-cyano-4-n-R-biphenyl selected from a group consisting of 4-cyano-4'-n-heptylbiphenyl, 4-cyano-4'-n-pentylbiphenyl, and mixtures thereof, and from about 5 to about 35 mole percent of 4'-cyanophenyl-4-n-heptylbenzoate.

6. The fluorescent medium of claim 5 comprising:
(a) from about 0.1 to about 0.5 weight percent of said fluorescent dye selected from a group consisting of 4-N,N-diemthylamino-4'-nitrostilbene, tetracene, 7-diethyl-4-methyl coumarin, 2,2'-(vinylenedi-p-phenylene)bisbenoxazole, and 2,2'-(vinylenedi-p-phenylene)hydroxyterephthalate and
(b) from about 99.5 to 99.9% of said host material comprising said liquid crystal material selected from the group consisting of 4-cyano-4'-n-heptylbiphenyl, 4-cyano-4'-n-pentyl-biphenyl, and mixtures thereof.

7. The fluorescent medium of claim 6 wherein said host comprises from abut 5 to about 20 weight percent of a chiral material and from about 80 to about 95 weight percent of said liquid crystal material, wherein said chiral material is selected from a group consisting of cholesterol nonanoate and compounds having a formula

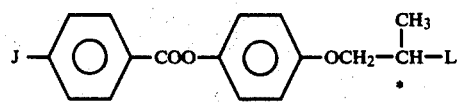

wherein J is an alkyl group containing from about 1 to about 7 carbon atoms, and L is an alkyl group containing from about 2 to about 4 carbon atoms and wherein * represents an asymmetrically substituted carbon atom.

8. The fluorescent medium of claim 1 wherein said host is selected from the group consisting of compounds of the formula 4-cyano-4'-R-biphenyl and mixtures thereof.

9. A fluorescent display comprising:
(a) means for cooperatively aligning a liquid crystal material comprising:
   (i) a means for defining a compartment for receiving said liquid crystal material,
   (ii) at least one pair of electrodes located within said compartment, and
   (iii) a means for providing an electric field across said electrodes for cooperatively aligning said liquid crystal material; and
(b) a fluorescent medium disposed therein comprising:
   (i) from about 0.01 to about 10 weight percent of a rigid lath shaped, fluorescent dye guest having a uniform major polarization axis and
   (ii) from about 90 to about 99.99 weight percent of a host comprising a liquid crystal material selected from a group consisting of
      (A) 4-cyano-4'-R-biphenyl, wherein R is selected from a group consisting of alkyl and alkoxy groups containing from about 3 to about 10 carbon atoms per group;
      (B) mixtures thereof; and
      (C) a nematic solution comprising a positive dielectric anisotropy moiety and another dielectric anisotropy moiety, said positive dielectric anisotropy moiety comprised of from about 40 to about 100 mole percent of said 4-cyano-4'-R-biphenyl and from about 0 to about 60 mole percent of 4'-cyanophenyl-4-Y-benzoate, wherein Y is selected from a group consisting of alkyl and alkoxy groups containing from about 1 to about 9 carbon atoms per group, and said other dielectric anisotropy moiety comprised of from about 0 to about 50 mole percent of a compound having a formula I

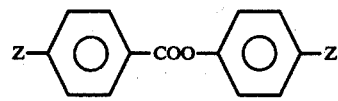

and from about 50 to about 100 mole percent of a compound having a formula II

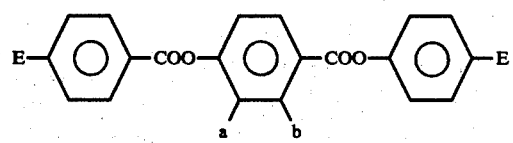

wherein each Z is independently selected from about 1 to about 9 carbon atoms per group, wherein each E is independently selected from a group consisting of alkyl and alkoxy groups containing from about 1 to about 7 carbon atoms per group, and wherein a and b are independently selected from a group consisting of hydrogen and chlorine, provided that if a is chlorine, b must be hydrogen and if b is chlorine, a must be hydrogen.

10. The fluorescent display of claim 9 wherein said host comprises from about 0.1 to about 50 weight percent of a chiral material and from about 60 to about 99.9 weight percent of said liquid crystal material, wherein said liquid crystal material is selected from a group consisting of said nematic solution (C) and 4-cyano-4'-R-biphenyl compounds (A).

11. The fluorescent display of claim 9 wherein said fluorescent medium comprises:
(a) from about 0.05 to about 5 weight percent of said fluorescent dye and
(b) from about 95 to about 99.95 weight percent of said host material wherein each R is independently selected from the group consisting of straight chain alkyl and alkoxy groups containing from about 5 to about 8 carbon atoms per group; and wherein said nematic solution (C) comprises from about 40 to about 80 mole percent of said positive dielectric anisotropy moiety and from about 20 to about 60 mole percent of said other dielectric anisotropy moiety; and wherein said positive dielectric anisotropy moiety is comprised of from about 65 to about 95 mole percent of 4-cyano-4'-n-R-biphenyl and from about 5 to about 35 mole percent of 4'-cyanophenyl-4-n-Y-benzoate; wherein each Z is independently selected from the group consisitng of straight chain alkyl and alkoxy groups containing from about 3 to about 6 carbon atoms per group; wherein each E is independently selected from the group consisting of straight chain alkyl and alkoxy groups containing from about 3 to about 5 carbon atoms per group.

12. The fluorescent display of claim 11 wherein said host comprises from about 1 to about 30 weight percent of a chiral material and from about 70 to about 99 weight percent of said liquid crystal material, wherein said liquid crystal material is selected from a group consisting of said nematic solution (C) and 4-cyano-4'-n-R-biphenyl compounds (A).

13. The fluorescent display of claim 11 wherein said liquid crystal material is selected from the group consisting of 4-cyano-4'-n-R-biphenyl (A); mixtures thereof (B); said nematic solution (C) wherein said positive dielectric anisotropy moiety is comprised of from about 65 to about 90 mole percent of 4-cyano-4-n-R-biphenyl selected from a group consisting of 4-cyano-4'-n-heptylbiphenyl, 4-cyano-4'-n-pentylbiphenyl, and mixtures thereof, and from about 5 to about 35 mole percent of 4'-cyanophenyl-4-n-heptylbenzoate.

14. The fluorescent display of claim 11 wherein the fluorescent medium comprises:
(a) from about 0.1 to about 0.5 weight percent of said fluorescent dye selected from a group consisting of 4-N,N-dimethylamino-4'-nitrostilbene, tetracene, 7-diethyl-4-methyl coumarin, 2,2'-(vinylenedi-p-phenylene)bisbenoxazole, and 2,2'-(vinylenedi-p-phenylene)hydroxyterephthalate and
(b) from about 99.5 to about 99.9 weight percent of said host material comprising said liquid crystal material selected from the group consisting of 4-cyano-4'-n-heptylbiphenyl, 4-cyano-4'-n-pentylbiphenyl, and mixtures thereof, and wherein said means for cooperatively aligning a liquid crystal material is an interdigitated liquid crystal display.

15. The fluorescent display of claim 14 wherein said host comprises from about 5 to about 20 weight percent of a chiral material and from about 80 about 95 weight percent of said liquid crystal material, wherein said chiral material is selected from a group consisting of cholesterol nonanoate and compounds having a formula

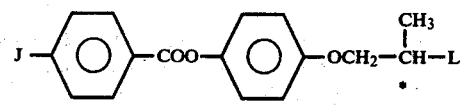

wherein J is an alkyl group containing from about 1 to about 7 carbon atoms, and L is an alkyl group containing from about 2 to about 4 carbon atoms, and wherein * represents an asymmetrically substituted carbon atom.

16. The fluorescent display of claim 13 wherein the fluorescent medium comprises:
(a) from about 0.1 to about 0.5 weight percent of said fluorescent dye selected from a group consisting of 4-N,N-dimethlyamino-4'-nitrostilbene, tetracene, 7-diethyl-4-methyl coumarin, 2,2'-(vinylenedi-p-phenylene)bisbenoxazole, and 2,2'-(vinylenedi-p-phenylene)hydroxyterephthalate and
(b) from about 99.5 to about 99.9 weight percent of said host material comprising said liquid crystal material selected from the group consisting of 4-cyano-4'-n-heptylbiphenyl, 4-cyano-4'-n-pentylbiphenyl, and mixtures thereof, and wherein said means for cooperatively aligning a liquid crystal material is a parallel plate liquid crystal display.

17. The fluorescent display of claim 16 wherein said host comprises from about 5 to about 20 weight percent of a chiral material and from about 80 to about 95 weight percent of said liquid crystal material, wherein said chiral material is selected from a group consisting of cholesterol nonanoate and compounds having a formula

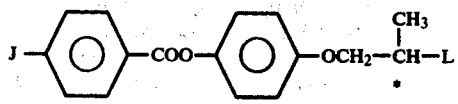

wherein J is an alkyl group containing from about 1 to about 7 carbon atoms, and L is an alkyl group containing from about 2 to about 4 carbon atoms, and wherein * represents an asymmetrically substituted carbon atom.

18. The fluorescent display of claim 9 wherein said host is selected from the group consisting of compounds of the formula 4-cyano-4'-R-biphenyl and mixtures thereof.

* * * * *

UNITED STATES PATENT AND TRADEMARK OFFICE
CERTIFICATE OF CORRECTION

PATENT NO. : 4,208,106
DATED : June 17, 1980
INVENTOR(S) : Chan S. Oh

It is certified that error appears in the above-identified patent and that said Letters Patent are hereby corrected as shown below:

Column 9, line 45, delete "4-N,N-diemthylamino-4'-nitrostilbene," and insert thereat --4-N,N-dimethylamino-4'-nitrostilbene,--.

Column 9, line 55, delete "abut" and insert thereat --about--.

Signed and Sealed this

Twenty-third Day of September 1980

[SEAL]

Attest:

SIDNEY A. DIAMOND

Attesting Officer

Commissioner of Patents and Trademarks